S. G. KENNEDY.
APPARATUS FOR MANUFACTURING CEMENTITIOUS CYLINDRICAL ARTICLES.
APPLICATION FILED APR. 27, 1910.

1,009,528.

Patented Nov. 21, 1911.
3 SHEETS—SHEET 1.

S. G. KENNEDY.
APPARATUS FOR MANUFACTURING CEMENTITIOUS CYLINDRICAL ARTICLES.
APPLICATION FILED APR. 27, 1910.

1,009,528.

Patented Nov. 21, 1911.

3 SHEETS—SHEET 2.

WITNESSES

INVENTOR
S. G. Kennedy
by F. N. Barber
attorney

S. G. KENNEDY.
APPARATUS FOR MANUFACTURING CEMENTITIOUS CYLINDRICAL ARTICLES.
APPLICATION FILED APR. 27, 1910.
1,009,528.
Patented Nov. 21, 1911.
3 SHEETS—SHEET 3.
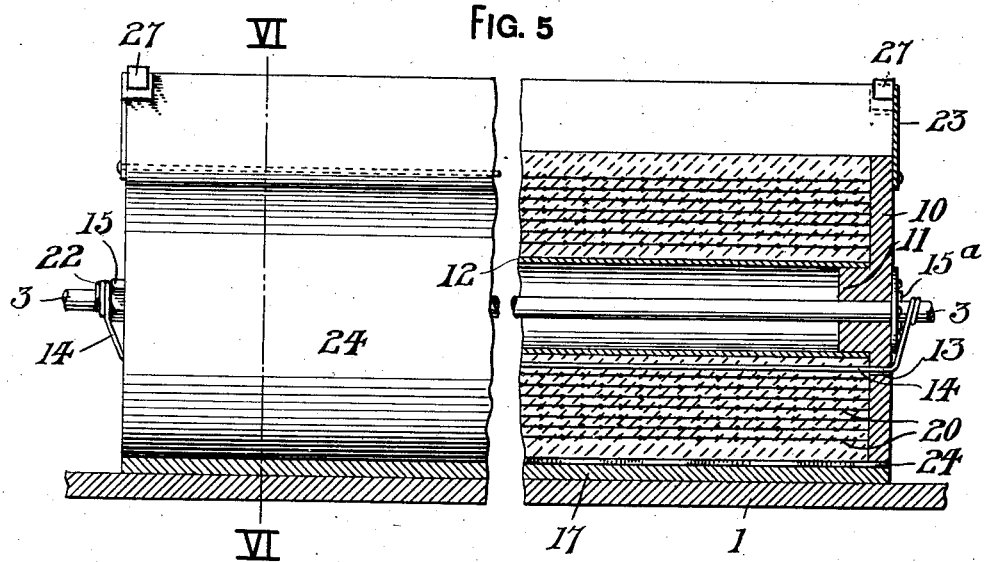
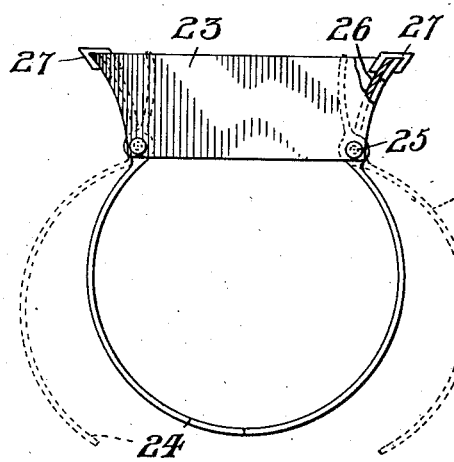
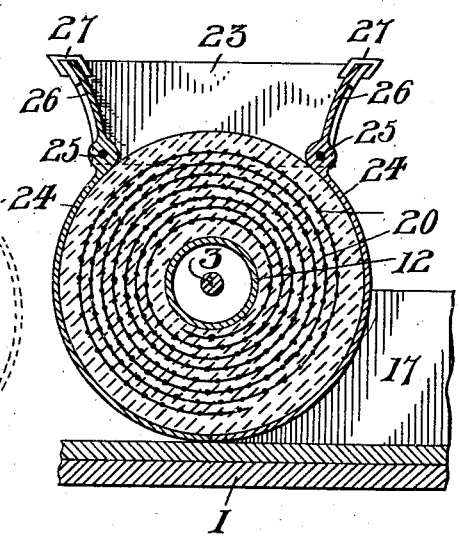
WITNESSES
INVENTOR

UNITED STATES PATENT OFFICE.

SAMUEL G. KENNEDY, OF EAST McKEESPORT, PENNSYLVANIA, ASSIGNOR OF ONE-HALF TO WILLIAM T. PIERCE, OF PITTSBURGH, PENNSYLVANIA.

APPARATUS FOR MANUFACTURING CEMENTITIOUS CYLINDRICAL ARTICLES.

1,009,528.

Specification of Letters Patent. Patented Nov. 21, 1911.

Application filed April 27, 1910. Serial No. 558,059.

*To all whom it may concern:*

Be it known that I, SAMUEL G. KENNEDY, a citizen of the United States, residing at East McKeesport, in the county of Allegheny and State of Pennsylvania, have invented new and useful Improvements in Apparatus for Manufacturing Cementitious Cylindrical Articles, of which the following is a specification.

My invention relates to apparatus for and methods of manufacturing cementitious cylindrical articles, as columns, piles, posts, and the like, and its object is to provide an apparatus by which the process of making a column or the like may be continuous until the desired diameter of the same has been obtained.

It is also a further object to produce, if required, a polished surface on the manufactured article.

It is also an object of my invention to provide a novel means of attaching a reinforcing metallic netting to the mandrel or axis, on which I wind the netting and cementitious material spirally.

Figure 1:
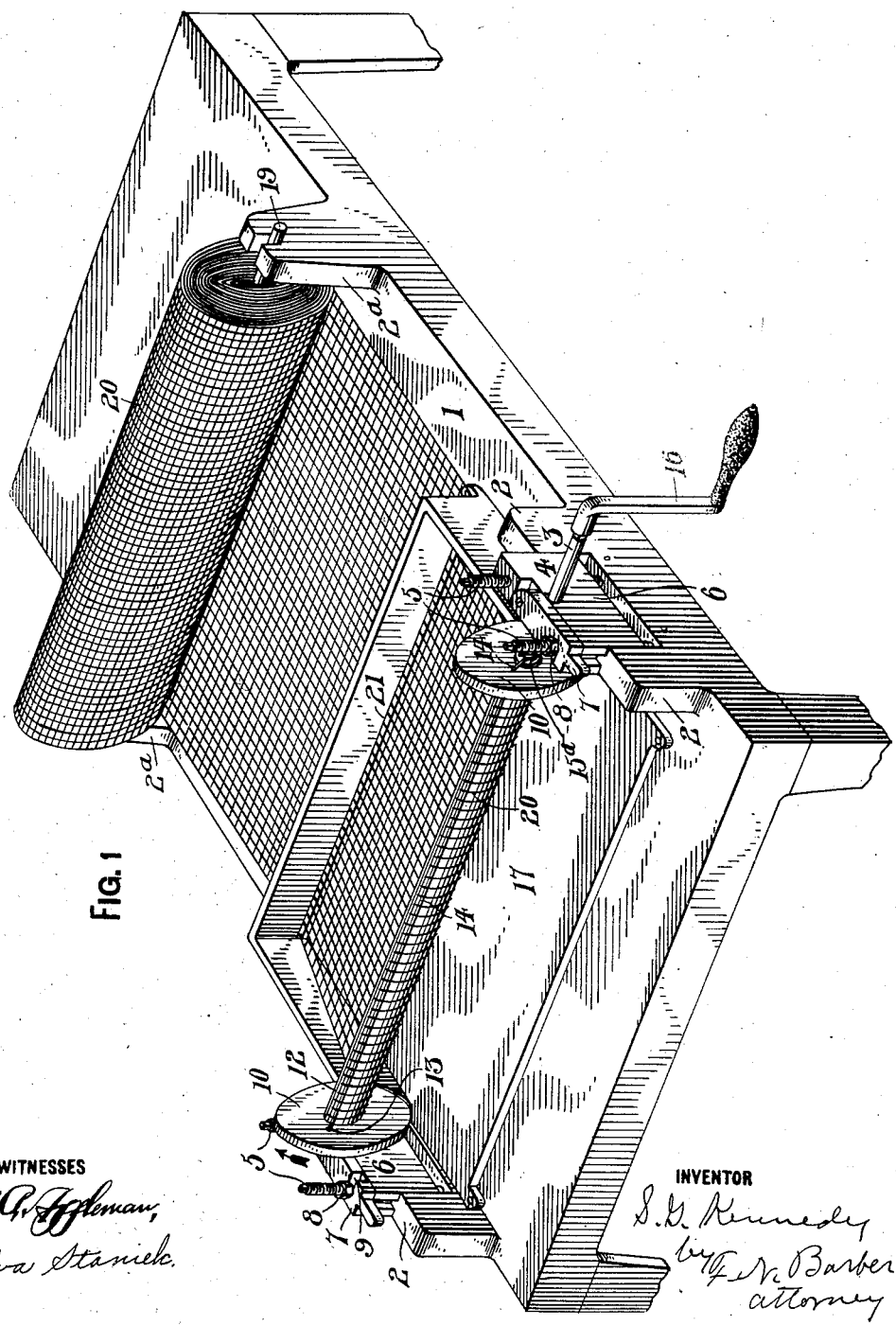
Figure 2:
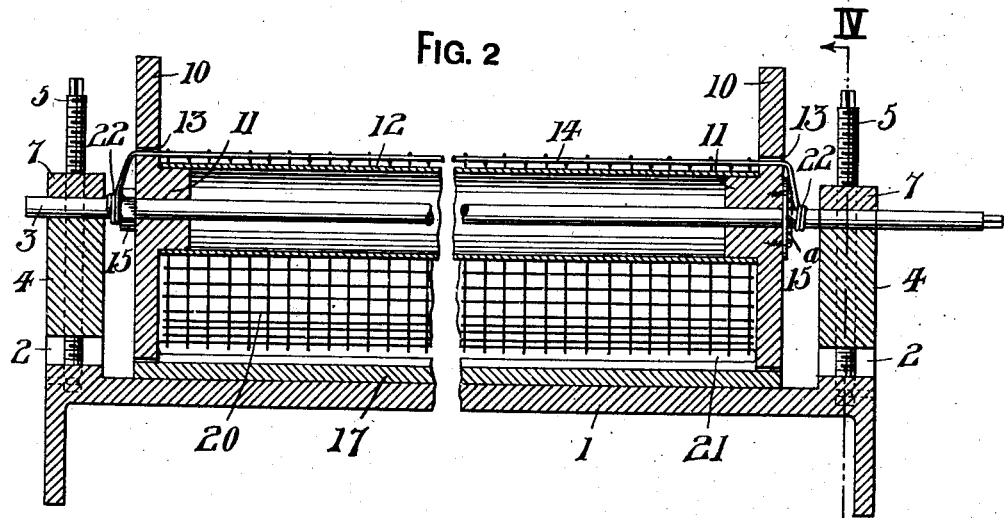
Figure 3:
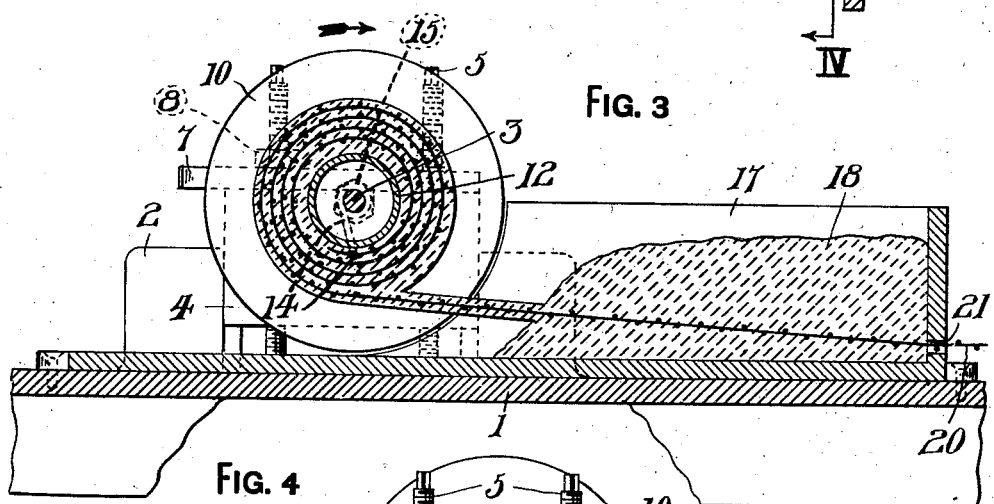
Figure 4:
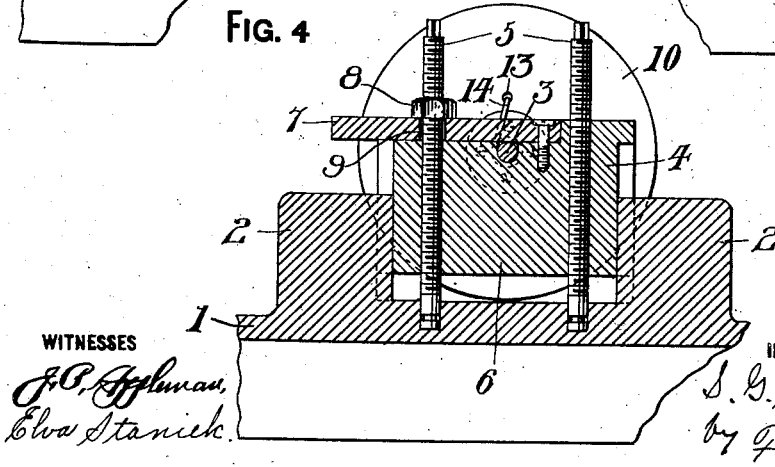

Referring to the accompanying drawings, Figure 1 is a perspective of the preferred form of my invention; Fig. 2, a vertical section of Fig. 1 through the bearings of the core; Fig. 3, a central longitudinal section of Fig. 1; Fig. 4, a section of Fig. 2 on the line IV—IV; Fig. 5, a vertical section, the right-hand half being taken longitudinally through the center of the core and the left-hand half being taken in front of the finishing mold; Fig. 6, a cross-section of Fig. 5 on the line VI—VI; and Fig. 7, an end view of the finishing mold or casing.

On the drawings, 1 represents the horizontal base of my improved apparatus for forming reinforced cylindrical cementitious articles.

2, 2 are upstanding guides on the base 1, and 3 is a horizontal shaft having bearings in the vertically adjustable journal boxes 4 located in the guides 2. The journal-boxes 4 may be raised or lowered by the screws 5 which work in the ends of the same and are seated in the base 1 below the journal-boxes.

Other means may be provided for causing or permitting the shaft to be raised or lowered to correspond to the diameter of the article to be made. The journal boxes 4 are made in two parts, the shaft 3 being seated in notches in the top of the lower part 6. The upper part 7 of each journal box is pivoted on the lower part so that it may be swung over the shaft 3 and locked by the nut 8 working on one of the screws 5. Each upper or shaft-locking part 7 has the notch 9 for one of the screws 5 so that the part 7 may lie directly over the part 6, where it may be clamped in position by the nut 8 and hold the shaft 3 in place in the journal-box. When the parts 7 are swung from over the shaft, the latter may be readily removed.

The shaft 3 is provided between the opposite pairs of guides 2 with the two heads 10 spaced apart by a distance equal to the length of the article to be made. The heads have the hubs or shoulders 11 facing each other and fitted into the opposite ends of the sheet metal cylinder 12, the ends of the cylinder abutting the inner faces of the heads immediately beyond the hubs 11. The heads 10 are provided each with the transverse hole 13, beyond the outer surface of the cylinder 12. The heads 10 are arranged so that the wire or other flexible device 14 extending through them is parallel with the shaft 3, or the axis of the cylinder. One end of the shaft between its bearing and the adjacent head 10 is threaded to receive the nut 15 which is turned up against the head to bind the heads and the cylinder into a firm structure, which I term a mandrel or core. The pin 15ª extending through the shaft 3 serving as an abutment for the outer face of the remaining head 10. The shaft may be rotated by the crank 16.

On the base 1 and back of and close to the core I place the hopper 17 which is provided to contain the cementitious material 18 which may be coarse or fine concrete, cement and sand, or other equivalent product.

At the rear of the hopper 17, I place the horizontal bar 19, on which the reel of coiled wire fabric or netting 20 or equivalent material, is supported. The bar 19 is shown journaled in the guides 2ª. The forward end of the fabric 20 is passed through the horizontal slot 21 at or near the bottom of the rear wall of the hopper and is brought to the core where the wire 14 is threaded through it, as shown in Figs. 1 and 2. After the wire has been placed in the holes 13 and threaded through the fabric, its ends are secured so as to revolve with the shaft, being preferably secured to the shaft 3 by winding them around the shaft a few times just beyond the nut 15 and the pin 15ª as shown at 22.

The fabric having been passed through the slot 21 and secured to the wire 14 as described, the cementitious material 18 is poured into the hopper 17 and on top of the fabric therein. The core is then rotated by the crank 16 in the direction indicated by the arrow on Figs. 1 and 3. More or less of the material will be carried along with the fabric and be wound spirally on the core with the fabric in alternate layers. The amount of cementitious material carried along with the fabric depends upon the relative consistency of the said material and also on the character of the fabric, for example, the number of wires to the inch. When the article is as large as desired, the screws 5 having been operated to provide the required clearance below the core, the fabric is cut off and the finishing mold or casing shown in Fig. 7 is applied to the said article as will be presently described.

The finishing mold or casing consists of the hopper 23 and the two wings or mold-sides 24 connected to opposite ends of the hopper by the pivot rods or pins 25. The hopper is made long enough to have its ends slightly overlap the outer faces of the heads 10. The wings or sides 24 are arcs of circles and face each other on opposite sides of the article about to receive its finishing coat. The wings 24 meet at their lower edges, their upper edges 26 being continued up between the ends of the hopper above the pivot rods 25, the V-shaped pieces 27 of metal being slipped over the upper edges of the hopper-lugs 27ª and the edges 26 of the wings 24 to prevent the separation of the wings.

A mixture of sand and cement or other finishing material is poured into the hopper 23. The shaft 3 is rotated to cause the finishing mixture to flow down into all parts of the mold space between the mold-sides or wings and the roughly finished article. By placing the right amount of the mixture in the hopper or by removing any excess thereof, the finished article may be made quite smooth and cylindrical particularly if the shaft 3 is kept in rotation. The nuts 8 are then slacked off and the parts 7 of the journal boxes 4 swung from over the shaft 3. This shaft with the molded article, preferably still in the finishing mold, is removed to a rack or other support where the cement can set and dry. A fresh core is then placed in the journal boxes 4 and another article made in the manner described. When the said removed article has become set so as to keep its shape, the pieces 27 are removed and the sides 24 of the finishing mold swung out, whereupon the mold can be removed.

I have shown the manufactured articles made wholly of the material, as sand and cement, which is the material with which the surface should be formed in all cases where a smooth appearance is desired or where it is desired to have the surface polished. In case the article is to be polished, I allow the same to cure or harden for several hours, but before it is dry, I place it in the journal boxes 4 or other journal supports and cause it to be revolved. While it is revolving, I apply to the surface thereof a block of smooth hard cement or a block of smooth stone, which will cause the article to become smooth and polished. I may use with the cement or stone block some pumice stone or other similar material to facilitate the process and increase the polish.

After the articles have become hard, and have been polished, if required, the ends of the wire 14 are unwound or cut off and the nuts 15 and the head 10 are removed from the shaft 3, which is withdrawn from the cylinder 12. The cylinder 12 is then withdrawn from the article and reassembled with the heads 10, the shaft 3, and the nuts 15 to form a core.

I claim—

1. In an apparatus for forming reinforced cementitious articles, a sheet-metal cylinder around which the articles are formed, a pair of heads at opposite ends of the cylinder, each provided with a hub extending into the end of the cylinder, a shaft detachably connected to the heads and extending through the cylinder, a wire extending through openings in the head and having its ends wound around the shaft, said wire being arranged so that the end of a fabric may be connected thereto.

2. In an apparatus for forming reinforced cementitious articles, a rotary support on which a fabric carrying cementitious material may be spirally wound, heads at each end of the support, means for securing the support and the heads together, a fabric holder parallel with the axis of the support and having its ends extended through the heads and a shaft on which the said support is mounted and to which the ends of the fabric holder are secured.

3. In an apparatus for forming cementitious articles, a rotary core on which the article is first roughly formed, a removable hopper adapted to be placed above the said article, and mold sides pivotally connected to the hopper and constructed to embrace the said article and to be spaced therefrom to provide a molding space.

Signed at Pittsburgh, Pa., this 21st day of April, A. D. 1910.

SAMUEL G. KENNEDY.

Witnesses:
F. N. BARBER,
ANNA R. BEATTY.